(12) United States Patent
Shinomiya et al.

(10) Patent No.: US 8,231,091 B2
(45) Date of Patent: Jul. 31, 2012

(54) CLIP AND MOUNTING STRUCTURE FOR MOUNTING AN AUTOMOTIVE BUMPER ACCESSORY COMPONENT

(75) Inventors: Ken Shinomiya, Yokohama (JP); Kazuya Handa, Yokohama (JP); Takeshi Ichikawa, Yokohama (JP); Masashi Ohkubo, Wako (JP); Motoyuki Momii, Wako (JP)

(73) Assignees: Honda Motor Co., Ltd., Tokyo (JP); Nifco Inc., Yokahama-Shi (JP)

( * ) Notice: Subject to any disclaimer, the term of this patent is extended or adjusted under 35 U.S.C. 154(b) by 280 days.

(21) Appl. No.: 12/733,348

(22) PCT Filed: Aug. 20, 2008

(86) PCT No.: PCT/JP2008/002255
§ 371 (c)(1),
(2), (4) Date: Jun. 18, 2010

(87) PCT Pub. No.: WO2009/025088
PCT Pub. Date: Feb. 26, 2009

(65) Prior Publication Data
US 2010/0252705 A1    Oct. 7, 2010

(30) Foreign Application Priority Data
Aug. 23, 2007  (JP) .................................. 2007-217529

(51) Int. Cl.
*F16B 1/00* (2006.01)
(52) U.S. Cl. .................. 248/229.26; 248/316.7
(58) Field of Classification Search ............ 248/229.11, 248/229.16, 229.21, 229.26, 316.1, 316.7, 248/300, 231.21; 24/290, 269, 297; 296/208, 296/1.08; 362/523
See application file for complete search history.

(56) References Cited

U.S. PATENT DOCUMENTS

| | | | | |
|---|---|---|---|---|
| 5,448,804 A | * | 9/1995 | Warren | 24/297 |
| 5,845,983 A | * | 12/1998 | Schmidt | 362/523 |
| 6,233,792 B1 | | 5/2001 | Kanie | |
| 7,552,516 B2 | * | 6/2009 | Okada et al. | 24/297 |
| 2003/0034425 A1 | * | 2/2003 | Hueser | 248/229.16 |

FOREIGN PATENT DOCUMENTS

| | | |
|---|---|---|
| JP | 58019111 U | 2/1983 |
| JP | 60-175908 U | 11/1985 |
| JP | 0798008 A | 4/1995 |
| JP | 8-121441 A | 5/1996 |
| JP | 2000-52900 A | 2/2000 |
| JP | 2004-218778 A | 8/2004 |

* cited by examiner

*Primary Examiner* — Ramon Ramirez
(74) *Attorney, Agent, or Firm* — Marshall & Melhorn, LLC

(57) ABSTRACT

Provided is a clip that allows two securing members to be firmly joined to each other without requiring a special working process to the applied to either one of the securing members. The clip for securing joining a first securing member to a second securing member comprises a base plate portion formed with a through hole, a first clamping piece extending from the base plate portion in a front side direction, and a second clamping piece extending from a part of the base plate portion intermediate between the first clamping piece and through hole in the front side direction and further extending above the through hole. A threaded member is passed into the through hole from a back side of the base plate portion to fixedly attach the second securing member to the back side of the base plate portion. As the threaded member advances in the through hole, the fastening member pushes the second clamping piece toward the first clamping piece so as to reduce the gap between the first clamping piece and second clamping piece.

7 Claims, 7 Drawing Sheets

CLIP AND MOUNTING STRUCTURE FOR MOUNTING AN AUTOMOTIVE BUMPER ACCESSORY COMPONENT

TECHNICAL FIELD

The present invention relates to a clip and a mounting structure for an automotive bumper accessory component, and in particular to a clip for fixedly joining two components to each other and a mounting arrangement for an automotive bumper accessory component. More particularly, the present invention relates to a clip for fixedly attaching a bumper accessory component to a back side of an automotive bumper face and a mounting structure for an automotive bumper accessory component using such a clip.

BACKGROUND OF THE INVENTION

An automotive bumper face is typically made of injection molded plastic material, and, conventionally, has not been considered suitable to be used for supporting a bumper accessory component such as a fog light. When fixedly securing a bumper accessory component to a bumper face, a planar piece extending from the back side of the bumper face may be integrally formed with the bumper face so that a threaded bolt for securing the bumper accessory component may be passed through this planar piece.

In order to form a through hole for passing a threaded bolt in a planar piece extending from a bumper face main body, an undercutting process is required, and this complicated the structure of the die assembly for molding the bumper face. Therefore, forming a through hole for passing a threaded bolt in the planar piece unjustifiably complicates the manufacturing process and increases the manufacturing cost.

When the bumper face has a complex shape, applying an undercutting process to the planar piece becomes impossible owing to the limitations imposed by the structure of the die assembly. In such a case, a through hole for receiving a threaded bolt cannot be formed in the planar piece, and the bumper face is unsusable as a support for a bumper accessory component.

A mounting structure for a bumper accessory component that is aimed at resolving this problem is proposed in Japanese patent laid open publication No. 8-121441 (patent document 1). According to this proposal, a certain clip is used for attaching a bumper accessory component to a planar piece extending from a bumper face main body. This clip is configured to grip the planar piece from two sides thereof to join another member to the planar piece, and is provided with claws for aiding the clamping of the planar piece from two sides. The clip is fitted into and engaged by a hole formed in another member desired to be attached to the plate portion.

According to this clip, a through hole is not required to be passed through the plate portion for receiving a threaded bolt and is free from the aforementioned problems so that the bumper face may be used as a support for mounting an accessory component.

BRIEF SUMMARY OF THE INVENTION

Tasks to be Accomplished by the Invention

However, the clip proposed in patent document 1 is secured to the planar piece solely by the biting of the claws that are resiliently urged toward the planar piece under the spring force of the claws so that the retaining force on the plate portion is limited, and an adequate securing force cannot be obtained.

In particular, when the plate portion has a hard surface or the surface of the plate portion has a low frictional coefficient, the retaining force is so low that an adequate securing force cannot be obtained.

In view of such problems of the prior art, a primary object of the present invention is to provide a clip and a mounting structure for an automotive bumper accessory component that allow a component to be secured to a plate portion of a bumper face in a reliable manner with a high retaining force without requiring to work the planar piece and without regards to the selection of the material for the plate portion.

Means to Accomplish the Tasks

To achieve such an object, the present invention provides a clip (1) for fixedly joining a first securing member (bumper plate portion 100) with a second securing member (fog light arm 200); a base portion (3) formed with a through hole (2); a first clamping portion (4) extending from the base portion in a front side direction thereof; and a second clamping portion (5) extending from a part of the base portion intermediate between the first clamping portion and through hole in the front side direction, and provided with an overlap portion (5A) overlapping radially with the through hole above the through hole, the first and second clamping portions being configured to clamp the first securing member between the first and second clamping portions; wherein the second clamping piece is configured to be displaced toward the first clamping portion when a fastening member (202) is passed into the through hole and pushed against the overlap portion of the second clamping portion so that a clamping force exerted upon the first securing member by the first and second clamping portions may be increased.

More particularly, the clip of the present invention secures the first securing member to the second securing member, and comprises a base portion and a first and second securing portions that extend from the base portion in the front side direction in a mutually spaced relationship so as to define a clamping space between them and clamping the first securing member introduced into the clamping space. The base portion is formed with a through hole that allows a fastening member to be introduced into the through hole from a side facing away from the front side thereof so that the second securing member may be attached to the back side of the base portion. The second clamping portion is provided with an overlap portion that radially overlaps with the through hole above the through hole so that the space between the first and second clamping portions may be reduced, and the clamping force exerted by the first and second clamping portions onto the first securing member introduced into the clamping space may be increased as the fastening member introduced into the through hole pushes the second clamping portion toward the second clamping portion.

Preferably, the clip of the present invention further comprises an auxiliary portion extending from a part of the base portion located on an opposite side of the through hole with respect to the second clamping portion in the front side direction to define a path of advance of the fastening member introduced into the through hole.

The clip of the present may further comprise a guide portion extending from the base portion in the front side direction and formed with a guide slot for receiving the first securing member, the guide portion guiding the first securing member into a space between the first and second clamping portions.

In the clip of the present invention, the fastening member preferably comprises a male thread member, and the through hole is configured to threadably receive the male thread member.

In the clip of the present invention, the fastening member preferably comprises a pin member integrally formed with the second securing member.

The clip of the present invention is preferably formed by bending a single piece of metallic plate.

To achieve such an object, the present invention provides a mounting structure using the clip as defined above, wherein the first securing member comprises a bumper face, and the second securing member comprises an accessory component secured to a back side of the bumper face.

Effect of the Invention

According to the clip of the present invention, simply by clamping the first securing member between the first and second clamping portions, without requiring an undercutting process for forming a through hole for receiving a mounting threaded bolt, the first and second securing members may be joined to each other. Also, by displacing the second clamping portion toward the first clamping portion, the clip is joined to the first securing member with an increased retaining force so that the first securing member and clip may be joined with a high retaining force without regards to the selection of the material for the first securing member, and a reliable connection can be established between them.

Figure 1:
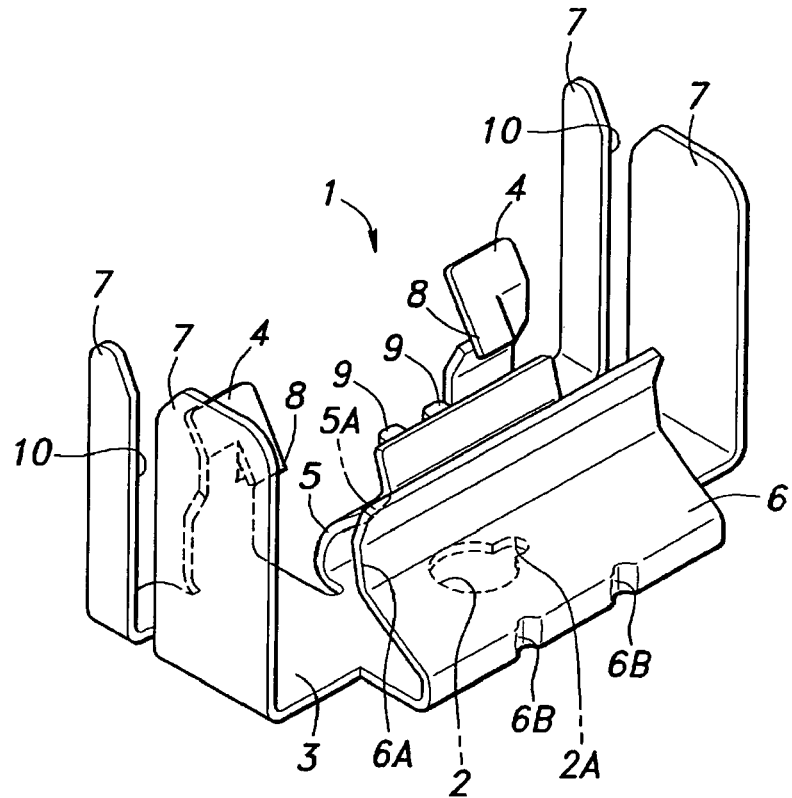
FIG. 1 is a perspective view of the clip given as a first embodiment of the present invention.
Figure 2:
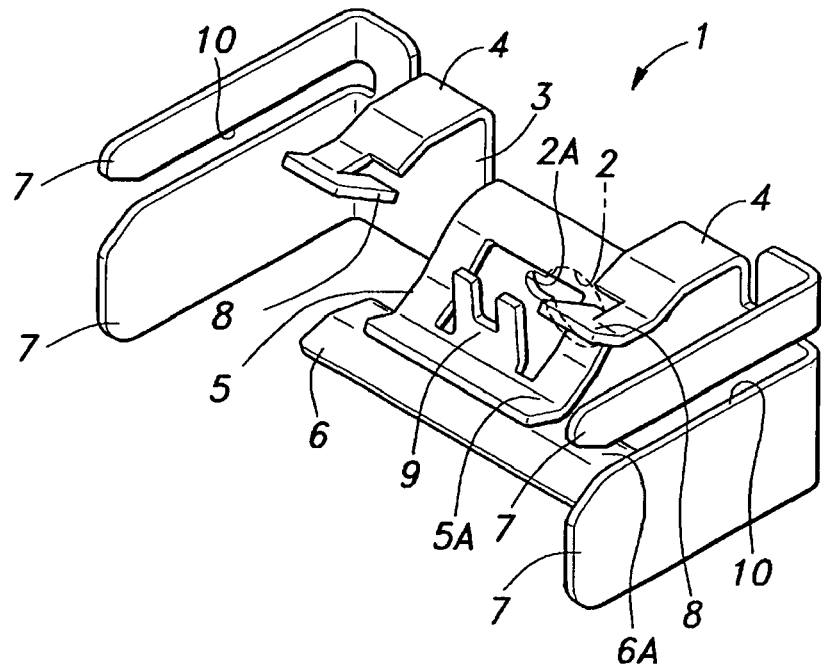
FIG. 2 is a perspective view of the clip of the first embodiment.
Figure 3:
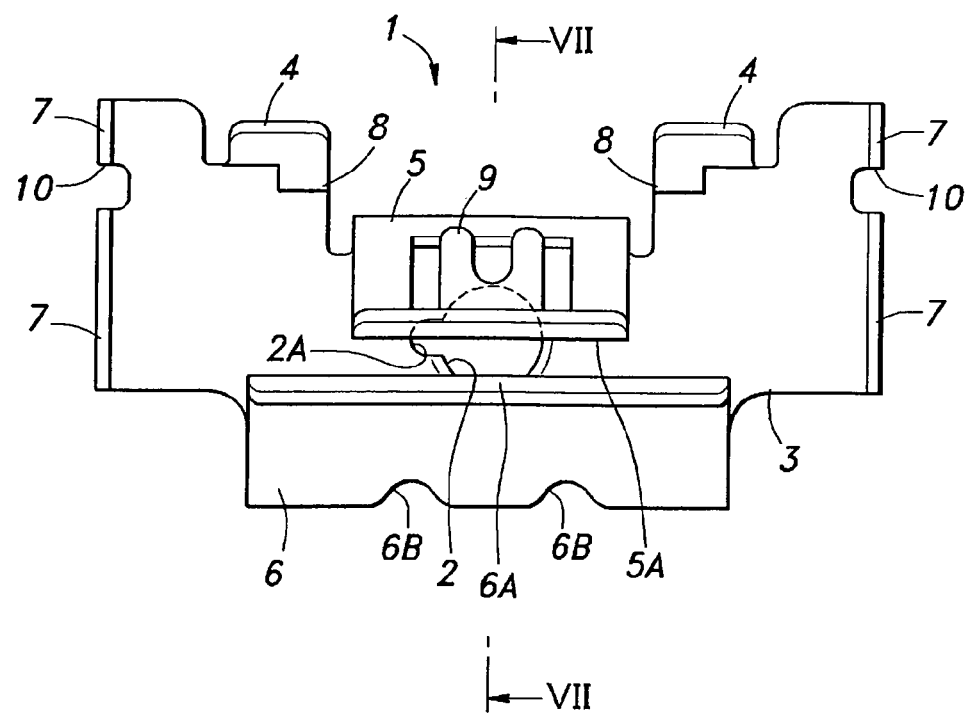
FIG. 3 is a plan view of the clip of the first embodiment.
Figure 4:
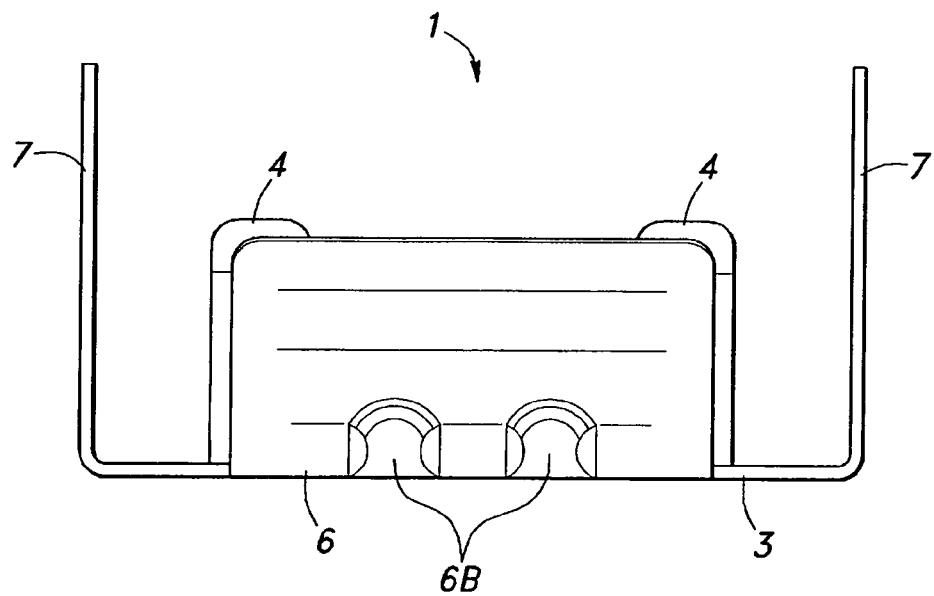
FIG. 4 is a side view of the clip of the first embodiment.

GLOSSARY 1, 11 clip
2 through hole
3 base plate portion
4 first clamping portion
5 second clamping portion
5A overlap portion
6, 12 auxiliary piece
7 guide piece
8 first barb
9 second barb
10 guide slot
100 bumper plate portion
200, 203 fog light arm
202 male thread member
204 pin member
205 annular recess

DETAILED DESCRIPTION OF THE PREFERRED EMBODIMENT(S)

A clip and a bumper mounting structure for a fog light arm given as a first embodiment of the preset invention is described in the following with reference to FIGS. 1 to 10.

Figure 8:
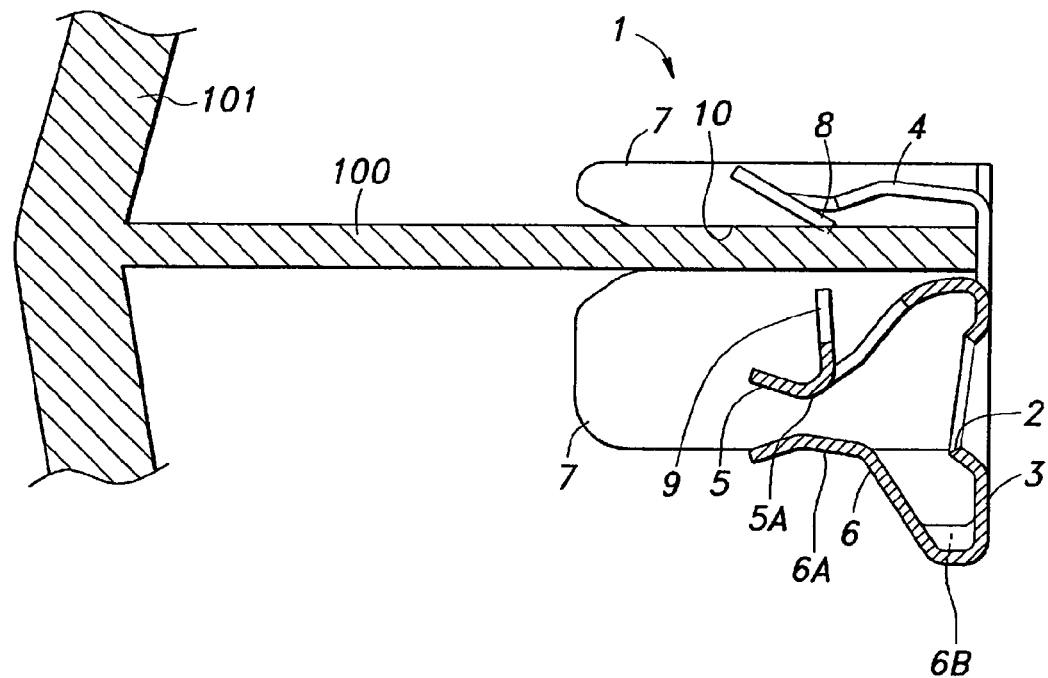
FIG. 8 is a sectional view showing a mounting structure using the clip of the first embodiment and a bumper plate portion.
Figure 9:
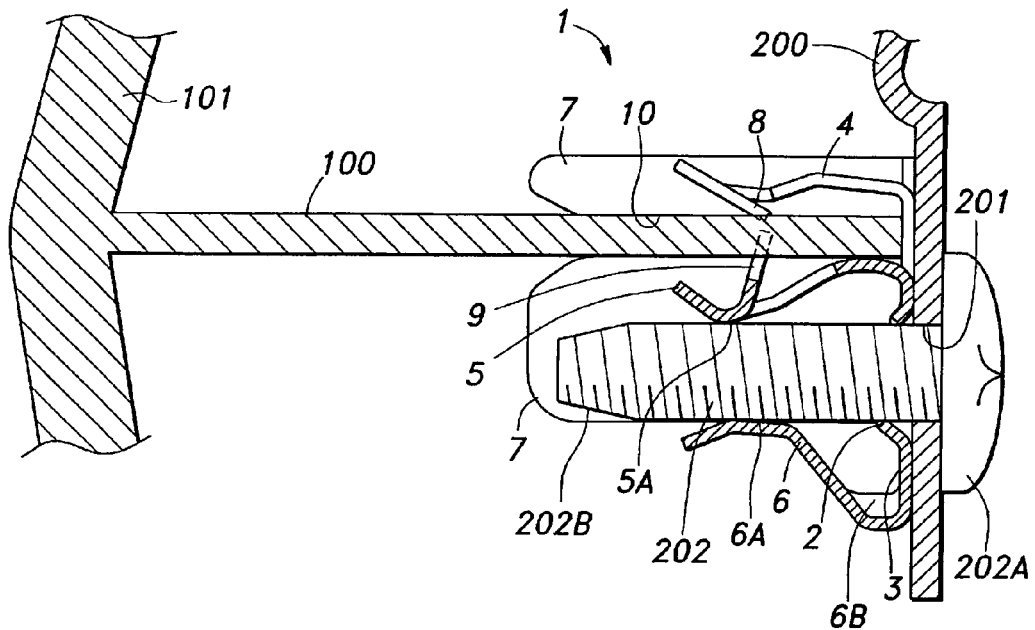
FIG. 9 is a sectional view of a mounting structure using the clip of the first embodiment, a bumper face and a fog light arm.
Figure 10:
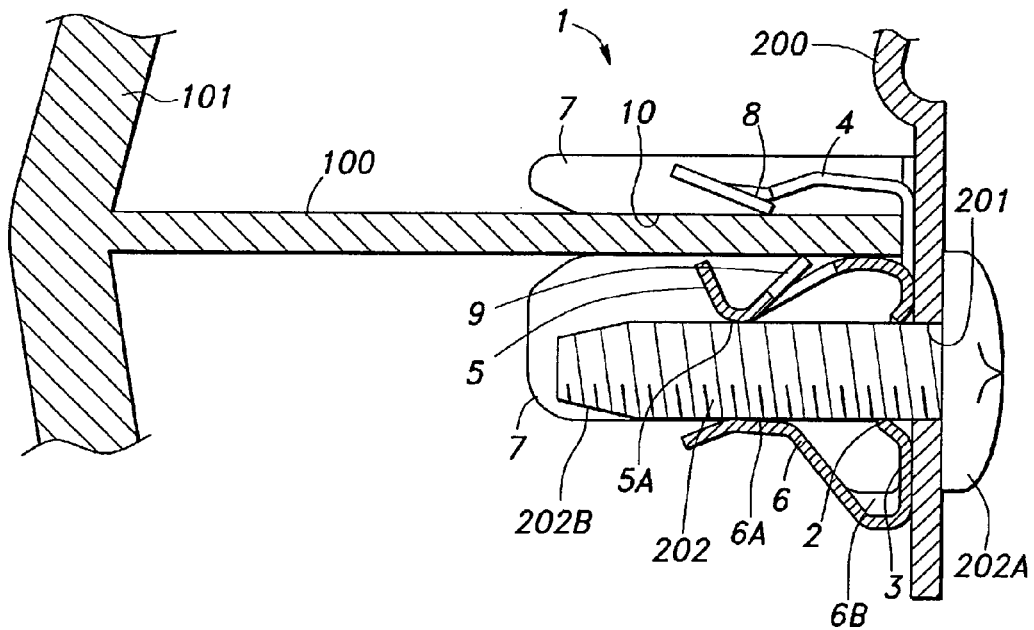
FIG. 10 is a sectional view of a mounting structure using the clip of the first embodiment, a bumper face and a fog light arm.

As shown in FIGS. 8 to 10, a clip 1 is configured to fixedly attach a second mounting member such as a support arm (fog light arm) 200 for supporting a fog light which is given as an example of bumper accessory components to a first mounting member such as a planar piece (bumper plate portion) 100 extending from a back side of a bumper face.

The bumper plate portion 100 is planar in shape so that the clip 1 may be attached thereto, and is integrally formed with the bumper face main body 101. The bumper face main body 101 integrally formed with the bumper planar piece 100 is made by injection molding flexible plastic material such as elastomer, but may also be made of metallic material.

The fog light arm 200 is made of metallic or plastic material, and is formed with an arm hole 201 for securing the same to a part of the clip 1. The periphery of the arm hole 201 is planar in shape so that a surface-to-surface contact may be made with respect to a planar base plate portion 3 of the clip 1.

The clip 1 illustrated in FIGS. 1 to 7 is made of a stamp formed steel plate member, and comprises a substantially rectangular, planar base plate portion 3 having a through hole 2 centrally formed therein, a pair of first clamping pieces 4 bent upright from one of the long sides of the base plate portion 3 in a front side direction from two separate respective locations and a second clamping piece 5 bent upright in the front side direction from a part of the base plate portion located adjacent to the through hole 2 and intermediate between the first clamping pieces 4 and through hole 2, and extending further above the through hole 2.

More specifically, in the clip 1, the first clamping pieces 4 and second clamping piece 5 define a clamping space 21 (see FIG. 7) that receives the bumper plate portion 100 therein. The through hole 2 is passed through the base plate portion 3 to the other side of the second clamping piece 5 facing away from the clamping space 21.

The through hole 2 passed through the base plate portion 3 consists of a circular hole that receives a male thread member 202 serving as a fastening member for securing the fog light arm 200 on the back side of the base plate portion 3. The male thread member 202 may consist of a screw or threaded bolt having a head 202A, and is passed through the arm hole 201 and threadably engaged by the through hole 2 so that the fog light arm 200 is held between the head 202A and the base plate portion 3 of the clip 1, and firmly joins the fog light arm 200 with the clip 1.

The male thread member 202 preferably consists of a self-tapping screw. The through hole 2 has an inner diameter adapted to the effective outer diameter of the male thread member 202 so that the male thread member 202 may be threadably engaged by the through hole 2. The through hole 2 is formed with a notch 2A on the peripheral edge thereof so as to accommodate small variations in the effective outer diameter of the male thread member 202.

Each first clamping piece 4 is bent upright from the base plate portion 3 in a perpendicular direction, and is provided with a first barb 8 cut and bent up from an upper part (free end part) of the first clamping piece 4. The first clamping piece 4 extends further so as to have a free end that projects into the clamping space 21 and is directed toward the second clamping piece 5.

The second clamping piece 5 is bent upright from the base plate portion 3 in a perpendicular direction, and extends above the through hole 2 so as to include an overlap portion 5A that radially overlaps with the through hole 2.

Figure 7:
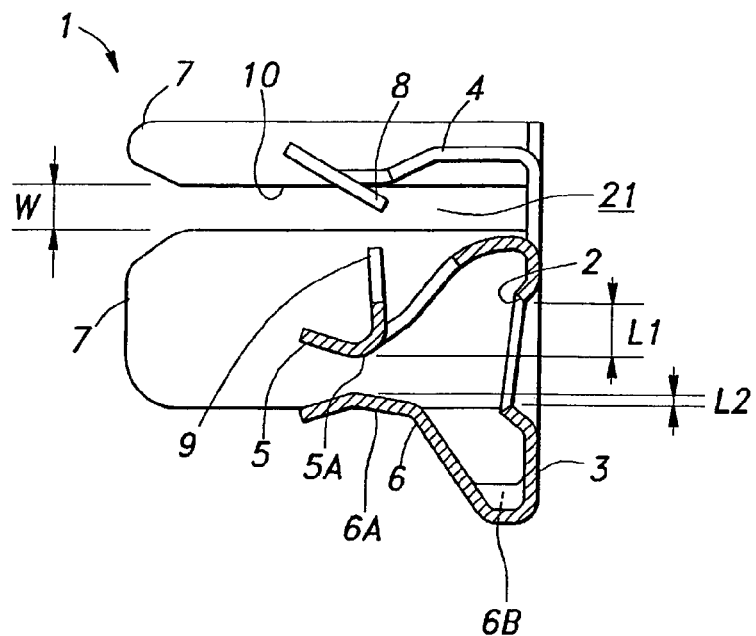
FIG. 7 is a sectional view taken along line VII-VII of FIG. 1.

As shown in FIG. 7, in an initial state where the clip 1 is not engaged with the bumper plate portion 100, fog light arm 200 and male thread member 202, the overlap portion 5A extends radially inward with respect to the through hole 2 above the through hole 2 by a length L1. The "overlap" as used herein means an overlap in a projected surface in parallel with the base plate portion 3.

The second clamping piece 5 is provided with a second barb 9 cut and bent up from an upper part (free end part) of the second clamping piece 5 so as to have a free end that projects into the clamping space 21 and is directed toward the first clamping piece 4.

The clamping space 21 or a first securing portion for securing the bumper plate portion 100 is thus formed between the first clamping pieces 4 and second clamping piece 5.

The clip 1 further comprises an auxiliary piece 6 bent upright from the base plate portion 3 and directed in the front side direction at a location opposite from the second clamping piece 5 with respect to the through hole 2 and a pair of guide pieces 7 each bent upright from the respective short side of the base plate portion 3 and directed in the front side direction.

The auxiliary piece 6 has the function to maintain the direction of the male thread member 202 as the male thread member 202 is passed into the through hole 2 and advances, and is bent upright from a side of the base plate portion 3 opposite from the first clamping pieces, and is further bent at an angle so as to extend above the through hole 2.

In the initial state, the auxiliary piece 6 extends radially into the through hole 2 and above the through hole 2, and radially overlaps with the through hole 2 by an overlap length of L2 (see FIG. 7). In this case also, the "overlap" as used herein means an overlap in a projected surface in parallel with the base plate portion 3.

The auxiliary piece 6 may be provided with beads 6B at the bent base end thereof so as to improve the stiffness thereof in maintaining the initial state with respect to the base plate portion 3.

Each guide piece 7 is formed with a guide slot 10 extending perpendicular to the base plate portion 3 at a part thereof facing the clamping space 21. The guide slot 10 serves as a guide when introducing the bumper plate portion 100 straight into the clamping space 21 defined between the first clamping pieces 4 and second clamping piece 5 by guiding the movement of the bumper plate portion 100 into the clamping space 21.

The width W of the guide slot 10 (see FIG. 7) may be the same as the thickness of the bumper plate portion 100, but may also be smaller than the thickness of the bumper plate portion 100 if the bumper plate portion 100 is made of deformable material. By making the width W of the guide slot 10 smaller than the thickness of the bumper plate portion 100, it may be used for temporarily securing the clip 1 to the bumper plate portion 100 by gripping the bumper plate portion 100 in the guide slot 10.

Figure 5:
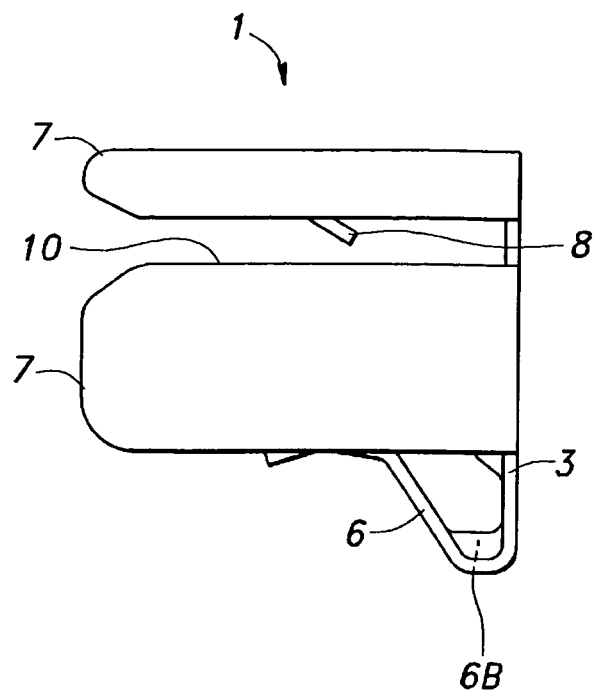
FIG. 5 is a side view of the clip of the first embodiment.
Figure 6:
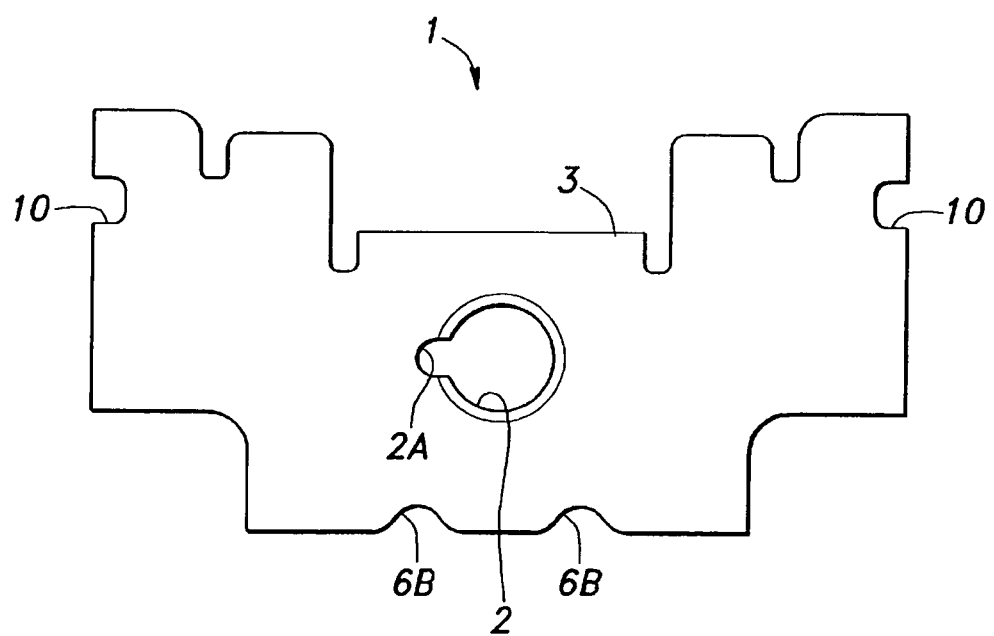
FIG. 6 is a bottom view of the clip of the first embodiment.

The free end of the first barb 8 of each first clamping piece 4 extends into the width W of the guide slot 10 or into the clamping space 21 in the initial state thereof as shown in FIG. 5 so that the first barb 8 engages the bumper plate portion 100 introduced into the clamping space 21 so that the bumper plate portion 100 may be retained in the clip 1 with a certain engagement force once the bumper plate portion 100 is forced into the guide slot 10 and received in the clamping space 21.

In an alternate embodiment, the guide slot 10 is formed at an angle with respect to the base plate portion 3 so that the position of the fog light arm 200 attached to the back side of the base plate portion 3 may be adjusted.

The clip 1 is not limited by a stamp formed component as disclosed in the foregoing embodiment, but may also consist of an injection molded plastic piece. The clip 1 may consist of either a stamp formed component or an injection molded component depending on the required mechanical strength thereof.

The mounting structure for mounting the fog light arm 200 to the bumper plate portion 100 by using the clip 1 of the foregoing embodiment is described in the following.

As shown in FIG. 8, the free end of the bumper plate portion 100 is pushed into the guide slot 10 of each guide piece 7, and forced into the clamping space 21 (first securing portion) defined between the first clamping pieces 4 and second clamping piece 5 while guided by the guide pieces 7. During this process, as the bumper plate portion 100 is engaged by the first barbs 8 projecting into the clamping space 21, the bumper plate portion 100 is required to be forced into the clamping space 21 with a certain force that overcomes the resistance caused by the first barbs 8. As the bumper plate portion 100 is forced into the clamping space 21, the first barbs 8 are pushed out of the clamping space 21, and the first clamping pieces 4 deflect away from the clamping space 21. If the guide slot width W is smaller than the thickness of the bumper plate portion 100, a frictional resistance produced between the bumper plate portion 100 and the side edges of the guide slot 10 is required to be overcome, and this adds to the force required to push the bumper plate portion 100 into the clamping space 21.

Once the bumper plate portion 100 is fully inserted in the clamping space 21, and the free end of the bumper plate portion 100 has abutted the base plate portion 3, the bumper plate portion 100 is clamped between the first barbs 8 and a side of the guide slot 10 with a small securing force owing to the restoring force of the first clamping pieces 4 that is transmitted to the first barbs 8. Also, the first barbs 8 biting into the material of the bumper plate portion 100 contributes to the securing of the bumper plate portion 100 to the first securing portion.

Thereafter, the fog light arm 200 is secured to the clip 1. The arm hole 201 has an inner diameter which is equal to or smaller than the inner diameter of the through hole 2 and smaller than the outer diameter of the head 202A of the male thread member 202. As shown in FIG. 9, the fog light arm 200 is fixedly attached to the back side of the base plate portion 3 of the clip 1 as the male thread member 202 is passed through the through hole 2 and threaded into the through hole 2 by being held between the head 202A of the male thread member 202 and base plate portion 3 of the clip 1.

When securing the fog light arm 200 to the clip 1, the male thread member 202 which is passed through the arm hole 201 is threaded into the through hole 2 until the free end of the male thread member 202 comes into contact with the second clamping piece 5 and auxiliary piece 6. As the male thread member 202 is threaded further into the through hole 2, the free end of the male thread member 202 engages the overlap portion 5A of the second clamping piece 5 and overlap portion 6A of the auxiliary piece 6 with the result that the second clamping piece 5 and auxiliary piece 6 are pushed radially away from the through hole 2, and the male thread member 202 is allowed to advance along the central axial line of the through hole 2 by being supported by the auxiliary piece 6 against a movement away from the second clamping piece 5.

In other words, the auxiliary piece 6 urges the male thread member 202 toward the second clamping piece 5 from a side of the male thread member 202 facing away from a side thereof at which the second clamping piece 5 engages so that the male thread member 202 may be allowed to advance in a direction perpendicular to the base plate portion 4 while receiving a reaction force from the second clamping piece 5. The overlap length L2 of the auxiliary piece 6 in the initial state may be selected such that the force which the male thread member 202 receives from the second clamping piece 5 is equal to the force which the male thread member 202 receives from the auxiliary piece 6.

As the male thread member 202 advances straight ahead, the second clamping piece 5 is pushed toward the first clamping pieces 4, and deflects toward the first clamping pieces 4, and the distance between the first clamping pieces 4 and second clamping piece 5 diminishes. During the time the sloping portion 202B in the front end of the male thread member 202 is in engagement with the second clamping piece 5, the second clamping piece 5 deflects toward the first clamping pieces 4 by a distance corresponding to the advance of the male thread member 202, and this increases the clamping force of the bumper plate portion 100 by a corresponding amount. The second clamping piece 5 is able to deflect by a distance of the overlap length L1 by which the second clamping piece 5 extends radially into the through hole 2 in the initial state.

The clamping force by which the bumper plate portion 100 is clamped between the first clamping pieces 4 and second clamping piece 5 in the clamping space 21 can be increased to such a level that the bumper plate portion 100 is firmly secured by the first barbs 8 of the first clamping pieces 4 and second barb 9 of the second clamping piece 5.

In particular, when the bumper plate portion 100 is made of relatively soft material such as plastic material, the first barbs 8 and second barb 9 bite into the two sides of the bumper plate portion 100 as shown in FIG. 9, and a secure attachment can be achieved. When the bumper plate portion 100 is made of relatively hard material such as metal, the first barbs 8 and second barb 9 may be unable to bite into the two sides of the bumper plate portion 100 as shown in FIG. 10, but, still, the bumper plate portion 100 can be firmly clamped and secured.

The clamping force of the bumper plate portion 100 by the first clamping pieces 4 and second clamping piece 5 can be adjusted by suitably selecting the advance of the male thread member 202 and the overlap length L1 of the second clamping piece 5 in the initial state. The relationship between the advance of the male thread member 202 and clamping force can be adjusted by changing the slanting angle of the free end of the male thread member 202.

Second Embodiment

Figure 11:
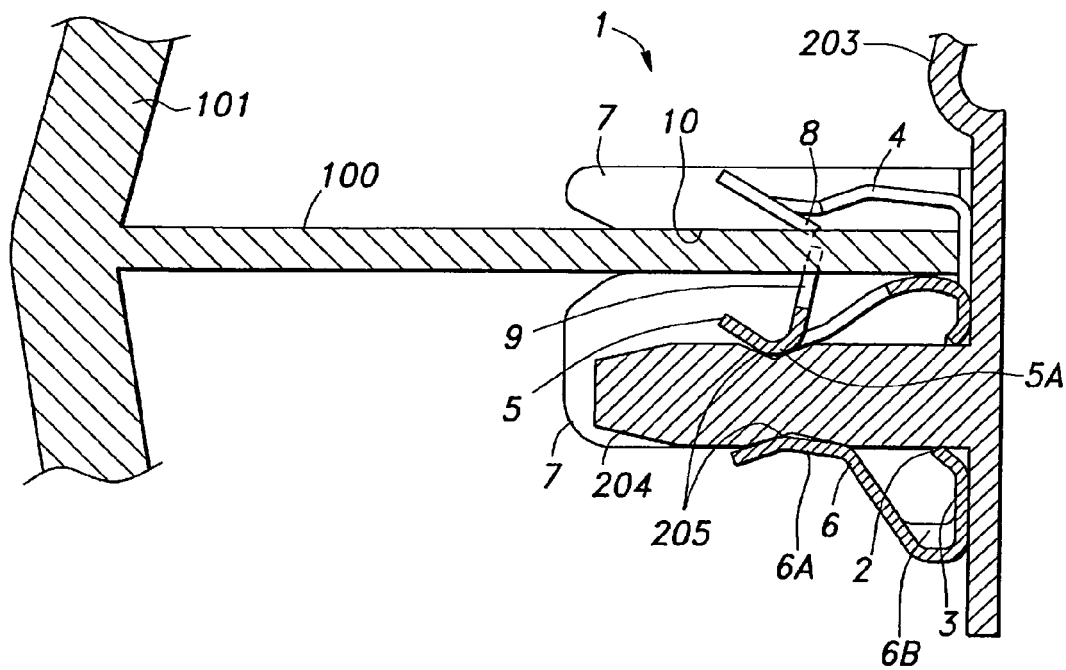
FIG. 11 is a sectional view of a mounting structure using the clip of a second embodiment, a bumper face and a fog light arm.

A clip and a bumper mounting structure for a fog light arm given as a second embodiment of the preset invention is described in the following with reference to FIG. 11. In the second embodiment, the parts corresponding to those of the first embodiment a denoted with like numerals without repeating the description of such parts.

In the second embodiment, the structure of the clip 1 is not different from that of the first embodiment, but differs from that of the first embodiment in that the second securing member and fastening member are formed as an integral piece. A columnar pin member 204 serving as the fastening member is integrally formed on the surface of the fog light arm 203 that serves as the second securing member. Around the outer circumference of the pin member 204 is formed an annular recess 205 which is configured to engage the second clamping piece 5 and auxiliary piece 6 when the pin member 204 is attached to the clip 1.

In the mounting structure of the second embodiment, similarly as in the first embodiment, after the bumper plate portion 100 is secured to the first securing portion of the clip 1, the pin member 204 of the fog light arm 203 is passed into the through hole 2 from the back side of the clip 1.

By inserting the pin member 204 in the through hole 2, the second clamping piece 5 is pushed radially outward of the through hole 2 or toward the bumper plate portion 100 so that the bumper plate portion 100 is gripped by the first clamping pieces 4 and second clamping piece 5 via the barbs 8 and 9 thereof. When the pin member 204 has been inserted in the clamping space by a prescribed depth, the overlap portions 5A and 6A of the second clamping piece 5 and auxiliary piece 6 (that overlap with the pin member 204) fit into the annular recess 205, and the fog light arm 203 is positioned with respect to the clip 1 with a detent action.

Owing to this arrangement, not only the advantages gained by the first embodiment are gained here but also the securing of the bumper plate portion 100 to the fog light arm 203 can be accomplished simply by pushing one onto the other. Thereby, the assembling of the vehicle can be simplified. This embodiment is particularly advantageous when the fog light arm 203 serving as the second securing member may not be formed with a through hole for receiving a threaded member.

Third Embodiment

Figure 12:
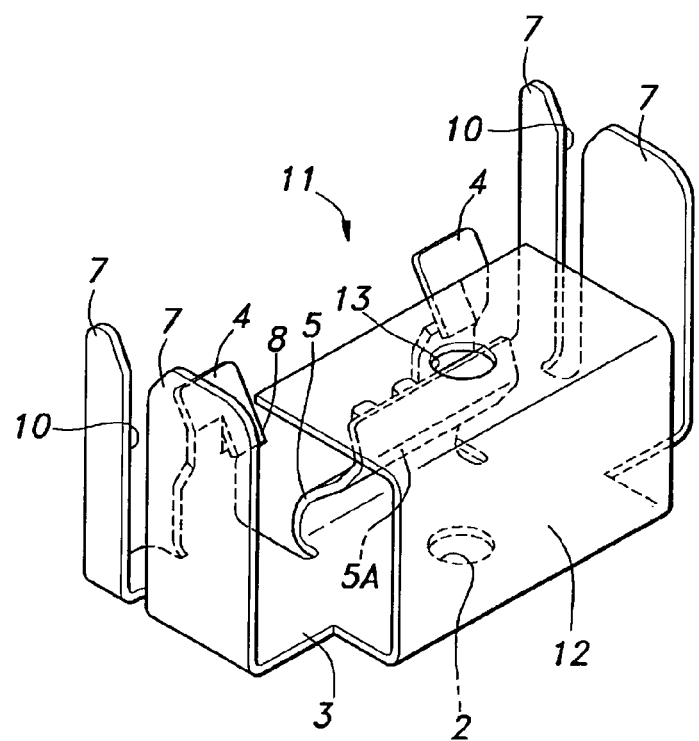
FIG. 12 is a perspective view of a clip given as a third embodiment of the present invention.
Figure 13:
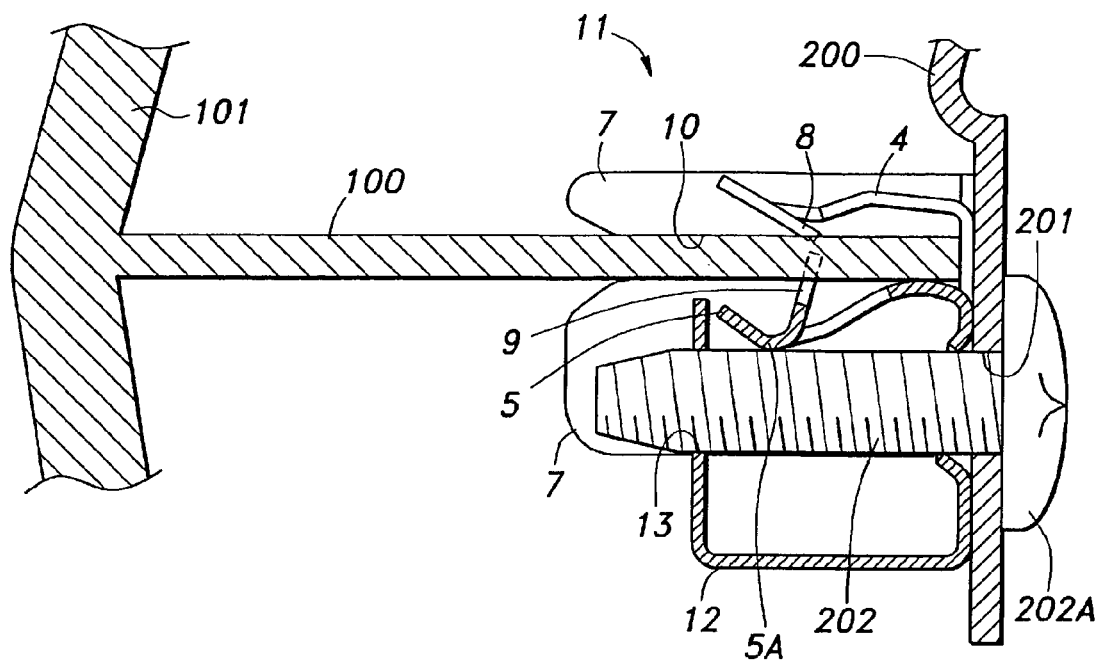
FIG. 13 is a sectional view of a mounting structure using the clip of the third embodiment, a bumper face and a fog light arm.

A clip and a bumper mounting structure for a fog light arm given as a third embodiment of the preset invention is described in the following with reference to FIGS. 12 and 13. In the third embodiment, the parts corresponding to those of the first embodiment a denoted with like numerals without repeating the description of such parts.

In the third embodiment, the structure of the clip 1 is not different from that of the first embodiment in most part, but differs from that of the first embodiment in the shape of the auxiliary piece 12.

The auxiliary piece 12 is bent upright perpendicularly with respect to the base plate portion 3 in the front side direction from a side of the base plate portion 3 opposite to the first clamping pieces 4, and is further bent in a free end portion thereof so as to form a parallel upper piece 12A extending above the through hole 2 in parallel with the base plate portion 3. Therefore, the auxiliary piece 12 defines a rectangular C-shape jointly with the base plate portion 3. The parallel upper piece 12A is formed with a through hole 13 which is coaxial with the through hole 2 and has a same diameter as the through hole 2.

The auxiliary piece 12 may be formed with beads for increasing the stiffness thereof so that the initial state of the auxiliary piece 12 may be maintained with respect to the base plate portion 3.

In the mounting structure of the third embodiment, similarly as in the first embodiment, after the bumper plate portion 100 is positioned in the first securing portion of the clip 1, the male thread member 202 is passed through the arm hole 201 of the fog light arm 201 and threaded into the through hole 2.

Because the path for the advance of the male thread member 202 is defined by the through hole 13, the male thread member 202 is kept perpendicular to the base plate portion 202. The second clamping piece 5 extending into the path for the advance of the male thread member 202 is pushed outward of the through hole 2 or toward the bumper plate portion 100 so that the bumper plate portion 200 is clamped between the first clamping pieces 4 and second clamping piece 5 via the first and second barbs 8 and 9.

The third embodiment provides advantages similar to those of the first embodiment.

The effects of the foregoing embodiments are enumerated in the following.

(1) The bumper plate portion 100 and fog lamp arm 200 can be securely joined to each other simply by clamping the bumper plate portion 100 or the first securing member with the first clamping pieces 4 and second clamping piece 5 without requiring an undercutting process for forming a mounting through hole in the first securing member. In particular, as the second clamping piece 5 is forced toward the first clamping pieces 4 by the fastening member such as the male thread member 202 and pin member 204, the bumper plate portion 100 can be joined to the clip 1, 11 with an increased force. Thereby, without regards to the particular selection of the material for the bumper plate portion 100, the bumper plate portion 100 and clip 1 can be joined to each other with a strong attaching force. Thus, the bumper plate portion 100 and fog light arm 200 can be firmly joined to each other.

(2) As the fastening member such as the male thread member 202 and pin member 204 is prevented from deviating away from an intended path of advance by the auxiliary piece 6, the fastening member can be pushed onto the second clamping piece with an increased force.

(3) By using the guide piece 7 formed with the guide slot 10, the first securing member such as the bumper plate portion 100 can be accurately guided to the prescribed position or clamping space 21 in the clip 1, 11.

(4) By using the male thread member 202 for the fastening member, the second securing member such as the fog light arm can be secured to the clip 1, 11 by using a threaded engagement. Also, by changing the threading advance distance of the male thread member 202, the clamping force of the clip 1, 11 on the bumper plate portion 100 can be adjusted. When the fastening member consists of the pin member 204 integrally formed with the fog light arm 200, the process of mounting the fog light arm 200 to the bumper plate portion 100 by using the clip 1 can be simplified.

(5) When the clip 1, 11 is made by bending a single piece of metallic plate, the clip can be manufactured at low cost so that the material cost can be minimized, and, also, the manufacturing process can be simplified.

The present invention was described in terms of specific embodiments thereof, but the present invention is not limited by the illustrated embodiments, and can be changed in various parts thereof. For instance, the first and second securing members consisted of planar plate members, but may also have different shapes such as prismatic shapes and columnar shapes. The distance between the first clamping pieces and second clamping piece and the width W of the guide slot 10 of the guide piece 7 can be suitably adjusted depending on the shape of the first securing member. The first and second clamping pieces 4 and 5 were formed with the respective barbs 8 and 9 in the foregoing embodiments, but may also be devoid of any such barbs in other embodiments.

The contents of the original Japanese patent application (Japanese patent application No. 2007-217529 filed on Aug. 23, 2007) on which the Paris Convention priority claim is made for the present application are incorporated in this application by reference.

Industrial Applicability

The clip of the present invention is highly useful for attaching a bumper accessory component such as a fog light on an automotive bumper face made by injection molding, and allows a bumper face to be conveniently used as a support for a bumper accessory component.

The invention claimed is:

1. A clip for fixedly joining a first securing member with a second securing member;
   a base portion formed with a through hole;
   a first clamping portion extending from the base portion in a front side direction thereof; and
   a second clamping portion extending from a part of the base portion intermediate between the first clamping portion and through hole in the front side direction, and provided with an overlap portion overlapping radially with the through hole above the through hole, the first and second clamping portions being configured to clamp the first securing member between the first and second clamping portions;
   wherein the second clamping piece is configured to be displaced toward the first clamping portion when a fastening member is passed into the through hole and pushed against the overlap portion of the second clamping portion so that a clamping force exerted upon the first securing member by the first and second clamping portions may be increased.

2. The clip according to claim 1, further comprising an auxiliary portion extending from a part of the base portion located on an opposite side of the through hole with respect to the second clamping portion in the front side direction to define a path of advance of the fastening member introduced into the through hole.

3. The clip according to claim 1, further comprising a guide portion extending from the base portion in the front side direction and formed with a guide slot for receiving the first securing member, the guide portion guiding the first securing member into a space between the first and second clamping portions.

4. The clip according to claim 1, wherein the fastening member comprises a male thread member, and the through hole is configured to threadably receive the male thread member.

5. The clip according to claim 1, wherein the fastening member comprises a pin member integrally formed with the second securing member.

6. The clip according to claim 1, wherein the clip is formed by bending a single piece of metallic plate.

7. A mounting structure using the clip as defined in claim 1, wherein the first securing member comprises a bumper face, and the second securing member comprises an accessory component secured to a back side of the bumper face.

* * * * *